United States Patent [19]
Saito et al.

[11] Patent Number: 5,470,216
[45] Date of Patent: Nov. 28, 1995

[54] FILM MANUFACTURING APPARATUS WITH BUBBLE CONTROLLING SENSOR

[75] Inventors: Masao Saito, Togane; Hideo Yamanaka, Chiba, both of Japan

[73] Assignee: Nippon Petrochmicals Company, Limited, Tokyo, Japan

[21] Appl. No.: 223,027

[22] Filed: Apr. 5, 1994

[30] Foreign Application Priority Data

Apr. 5, 1993 [JP] Japan .................................. 5-078079

[51] Int. Cl.⁶ .................................................. B29C 47/92
[52] U.S. Cl. ...................... 425/72.1; 264/569; 264/407; 425/141
[58] Field of Search ................... 425/72.1, 141, 425/150, 174.2; 264/40.2, 569

[56] References Cited

U.S. PATENT DOCUMENTS

| | | | |
|---|---|---|---|
| 3,090,998 | 5/1963 | Heisterkamp et al. | 264/569 |
| 3,207,823 | 9/1965 | Glyde et al. | 264/569 |
| 3,988,582 | 10/1976 | Harman | 425/72.1 |
| 4,101,614 | 7/1978 | Havens | 264/569 |
| 4,201,741 | 5/1980 | Pannenbecker | 264/40.2 |
| 4,203,942 | 5/1980 | Sims, Jr. et al. | 264/569 |
| 4,287,151 | 9/1981 | Esakov et al. | 425/72.1 |
| 4,377,540 | 3/1983 | Cluett et al. | 425/174.2 |
| 4,882,104 | 11/1989 | Dobrowsky | 264/40.2 X |
| 5,281,375 | 1/1994 | Konermann | 264/569 X |
| 5,288,441 | 2/1994 | Collins | 425/141 |
| 5,330,342 | 7/1994 | Linss et al. | 425/150 |
| 5,352,393 | 10/1994 | Joseph | 425/174.2 |

FOREIGN PATENT DOCUMENTS

| | | |
|---|---|---|
| 59-40608 | 1/1977 | Japan . |
| 58-78725 | 5/1983 | Japan . |
| 58-111710 | 7/1983 | Japan . |
| 61-256212 | 11/1986 | Japan . |

*Primary Examiner*—Richard L. Chiesa
*Attorney, Agent, or Firm*—Burns, Doane, Swecker & Mathis

[57] ABSTRACT

A film manufacturing apparatus includes a circular die having a lip-shaped circular outlet for extruding a molten plastic in an annular form and an air passage for blowing air into the annular molten plastic to form a bubble. A water containing cooling ring cools the bubble and restrains the bubble so as to form a tubular plastic film below the cooling ring. An ultrasonic sensor is arranged near the circular die and extends substantially downwardly obliquely toward the center of the bubble for detecting the distance between the surface of the bubble and the ultrasonic sensor, and a controller controls an air supply regulating valve arranged in a line leading to the air passage to control the size of the bubble. Also, an ambient temperature sensor is arranged for correcting the speed of the ultrasonic signal, and a receiving time selecting device is arranged for correcting the time period during which an ultrasonic signal reflected from the bubble can be received.

17 Claims, 6 Drawing Sheets

Fig. 7
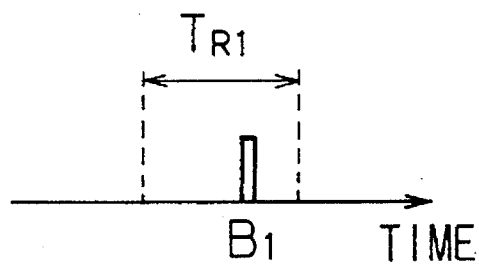
Fig. 8
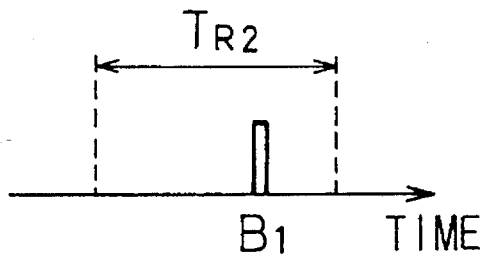
Fig. 9
```
┌─────────────────────────┐
│  APPROACH SPEED         │──122
│   ⌐ ─ ─ ─ ┐             │
│   ( 1600 )  MM/S        │
│   └ ─ ─ ─ ┘             │
└─────────────────────────┘
```

FILM MANUFACTURING APPARATUS WITH BUBBLE CONTROLLING SENSOR

BACKGROUND OF THE INVENTION

1. Field of the Invention

The present invention relates to a film manufacturing apparatus using an inflation (or air blowing) method, and in particular, the present invention relates to a film manufacturing apparatus in which the size of a bubble is detected by an ultrasonic sensor to control the amount of air in the bubble so as to maintain the bubble at a constant size in an inflation process.

2. Description of the Related Art

In a film manufacturing apparatus using an inflation (air blowing) method, a molten plastic is extruded from a circular die in the annular form. The annular plastic is cooled and becomes a tubular plastic film having a predetermined diameter. The tubular plastic film is then folded into two flat sheets which are wound into a roll. A photoelectric sensor or an ultrasonic sensor is used for controlling the diameter of the tubular plastic film or the width of the folded sheets.

For example, Japanese Examined Patent Publication (Kokoku) No. 59-40468 and Japanese Unexamined Patent publication (Kokai) No. 58-78725 disclose an example using a photoelectric sensor comprising a light emitting element and a light receiving element which are arranged on a line tangential to a tubular plastic film. A frost line appears between the annular molten plastic and the tubular plastic film, and the photoelectric sensor is arranged to detect the size of the tubular plastic film having a predetermined size. The light from the light emitting element is blocked by the tubular plastic film when the size of the tubular plastic film becomes greater than the predetermined size, and the light passes from the light emitting element to the light receiving element when the size of the tubular plastic film becomes smaller than the predetermined size, whereby the size of the tubular plastic film can be detected by the photoelectric sensor and thus the size of the tubular plastic film can be controlled in response to the output from the photoelectric sensor.

Also, Japanese Unexamined Patent Publication (Kokai) No. 61-256212 discloses an example using a plurality of ultrasonic sensors. Each of the ultrasonic sensors can detect a distance between the tubular plastic film and the ultrasonic sensor by transmitting an ultrasonic wave toward the tubular plastic film and receiving an ultrasonic wave reflected at the tubular plastic film. The size of the tubular plastic film can be calculated from the detected distance. In this prior art, four ultrasonic sensors are equidistantly arranged around the tubular plastic film so that the size of the tubular plastic film can be calculated from an average of outputs of four ultrasonic sensors to control the size of the tubular plastic film.

In the film manufacturing apparatus utilizing an inflation method, the annular molten plastic extruded from the circular die is cooled by an air cooling means or a water cooling means and the cooled annular molten plastic becomes a tubular plastic film. The air cooling means merely blows a cooling air to the annular tubular plastic and does not restrict or control the size and the position of the annular molten plastic. Therefore, the size and the position of the tubular plastic film changes, so the above described Japanese Unexamined Patent Publication (Kokai) No. 61-256212 uses four ultrasonic sensors which are equidistantly arranged around the tubular plastic film so that an average of the outputs of the four ultrasonic sensors can be obtained. Usually, when the air cooling means is used, the bubble, which is an enlarged spherical part of the annular molten plastic, is not formed adjacent to the circular die.

The water cooling means (including the case where an auxiliary air cooling means is used with the water cooling means) comprises a cooling ring containing cooling water. The inner periphery of the cooling ring substantially contacts the annular molten plastic and controls the size and the position of the annular molten plastic. Therefore, the annular molten plastic is cooled and solidified in this condition and becomes the tubular plastic film below the cooling ring. The size of the tubular plastic film is thus controlled by the water cooling ring. Therefore, it is not necessary to detect the size of the tubular plastic film in this case.

When the water cooling means is used and sufficient air is blown in the annular molten plastic, a bubble, which is an enlarged spherical part of the annular molten plastic, is formed between the circular die and the water cooling ring. In this case, it is desirable to control the size of the bubble. For this purpose, the inventors of this application have used a photoelectric sensor comprising a light emitting element and a light receiving element to detect the size of the bubble. The light emitting element and the light receiving element are arranged on a line tangential to a bubble having a predetermined size. The light from the light emitting element is blocked when the size of the bubble becomes greater than the predetermined size, and the light passes from the light emitting element to the light receiving element when the size of the bubble becomes smaller than the predetermined size, whereby the size of the bubble can be detected.

Problems of this arrangement are that an operator must have experience and skill to set the light emitting element and the light receiving element on a line tangential to a bubble having a predetermined size, and yet a considerable time is necessary for this work. It is necessary to change the position of the light emitting element and the light receiving element whenever the product to be manufactured changes, and the position of the light emitting element and the light receiving element must be adjusted depending on a film forming speed, a kind of plastic, the thickness of the resultant film, and the temperature of the molten plastic. A problem is that the position of the light emitting element and the light receiving element is not logically decided but must be decided from experience. Especially, the problem is serious when a bubble having a larger diameter (for example, larger than 600 mm) is to be formed, or when a plurality of kinds of products must be manufactured.

As described above, a plurality of ultrasonic sensors are used for detecting the size of a tubular plastic film after an annular molten plastic is cooled and solidified. However, there is no example of using an ultrasonic sensor for detecting the size of a bubble of an annular molten plastic which varies in size or vibrates from time to time. Also, there is no example of using an ultrasonic sensor for detecting the size of an annular molten plastic in the case where a bubble is not formed but a frost line appears.

SUMMARY OF THE INVENTION

The object of the present invention is to provide a film manufacturing apparatus by which it is possible to easily and reliably detect the size of an annular molten plastic with the use of an ultrasonic sensor.

The object of the present invention is to provide a film manufacturing apparatus by which it is possible to easily and reliably detect the size of a bubble.

The object of the present invention is to provide a film manufacturing apparatus by which it is possible to easily and reliably detect the size of an annular molten plastic in the case a frost line appears.

According to the present invention, there is provided a film manufacturing apparatus comprising a circular die having an axis, an inlet for a molten plastic, a lip-shaped circular outlet around the axis for extruding a molten plastic in an annular form, and blowing means for blowing air into the annular molten plastic extruded from the lip-shaped outlet, a cooling means for cooling the annular molten plastic to form a tubular plastic film, an ultrasonic sensor for detecting the distance between the surface of the annular molten plastic and the ultrasonic sensor by transmitting an ultrasonic wave toward the annular molten plastic and receiving an ultrasonic wave reflected from the annular molten plastic, and control means for controlling the blowing means in response to an output from the ultrasonic sensor.

Preferably, the cooling means comprises a cooling ring containing cooling water and arranged below the circular die to cool the molten plastic and to restrain the size of the molten plastic to form the bubble between the circular die and the cooling ring and to form a tubular plastic film below the cooling ring.

Where the water cooling ring is used, a bubble of the annular plastic is formed between the circular die and the cooling ring, and the ultrasonic sensor arranged outside the bubble detects the size of the bubble as a distance between a surface of the bubble and the ultrasonic sensor. The control means controls the blowing means in response to an output from the ultrasonic sensor such that, for example, the amount of air in the bubble is reduced when the distance between the bubble and the ultrasonic sensor is smaller than a first predetermined value, and the amount of air in the bubble is increased when the distance between the bubble and the ultrasonic sensor is greater than a second predetermined value greater than the first predetermined value. Accordingly, it is sufficient to arrange a single ultrasonic sensor and it is possible to easily and reliably detect the size of a bubble to control the size of the bubble.

Alternatively, the cooling means comprises an air cooling means for blowing cooling air to the annular molten plastic so that a frost line appears beyond which the annular molten plastic becomes a tubular plastic film. In this case, the size of the annular molten plastic can be detected as the distance between annular molten plastic and the ultrasonic sensor. Since the position of the annular molten plastic is nearer to the circular die than the position of the tubular plastic film which is solidified, a variation in the size of the annular molten plastic is small. Accordingly, it is sufficient to arrange a single ultrasonic sensor and it is possible to easily and reliably detect the size of a annular molten plastic to control the size of the tubular plastic film.

Preferably, the ultrasonic sensor is arranged so as to aim at a point on a line passing through the axis of the circular die from the outside of a bubble formed between the circular die and the cooling ring. By this arrangement, the ultrasonic wave transmitted from the ultrasonic sensor can be substantially reflected at the surface of the bubble and the reflected ultrasonic wave can be effectively input into the ultrasonic sensor.

Preferably, the ultrasonic sensor is arranged near the circular die and extends downwardly obliquely toward the substantial center of the spherical bubble. By this arrangement, it is possible to detect the size of the bubble immediately after the latter is extruded from the circular die, and to control the size of the bubble with a good response.

Preferably, the film manufacturing apparatus further comprises temperature detecting means for detecting an ambient temperature around said film manufacturing apparatus, and speed correction means for correcting for the speed of a used ultrasonic wave in response to an output from the temperature detecting means. By this arrangement, it is possible to correct for the speed of the ultrasonic wave which varies depending on the temperature, and to precisely detect the size of the bubble.

Preferably, the film manufacturing apparatus further comprises a speed detecting means for detecting a varying speed of the surface of the bubble facing to the ultrasonic sensor, and a receiving time selecting means operative in response to an output from the speed detecting means for correcting the time period during which an ultrasonic wave reflected at the bubble can be received. By this arrangement, it is possible to exactly detect the size of the bubble even when the bubble is inflating, shrinking, or vibrating.

Preferably, the blowing means comprises an air passage arranged in the circular die, an air supply line in communication with the air passage, an air discharge line in communication with the air passage, an air supply regulating valve arranged in the air supply line, and a discharge regulating valve arranged in the air discharge line, the control means controlling at least one of the air supply regulating valve and the discharge regulating valve. In this case, preferably, the discharge regulating valve is normally opened at a small opening degree, and the control means mainly controls the air supply regulating valve in response to an output from the ultrasonic sensor.

BRIEF DESCRIPTION OF THE DRAWINGS

The present invention will become more apparent from the following description of the preferred embodiments, with reference to the accompanying drawings, in which:

FIG. 7 is a view illustrating an example of the period during which the ultrasonic wave can be received determined by a receiving time selecting means;

FIG. 8 is a view illustrating another example of the period during which the ultrasonic wave can be received determined by a receiving time selecting means;

FIG. 9 is a view illustrating an example of the display which shows the varying speed of the surface of the bubble facing the ultrasonic sensor detected by the speed detecting means.

DESCRIPTION OF THE PREFERRED EMBODIMENTS

Figure 1:
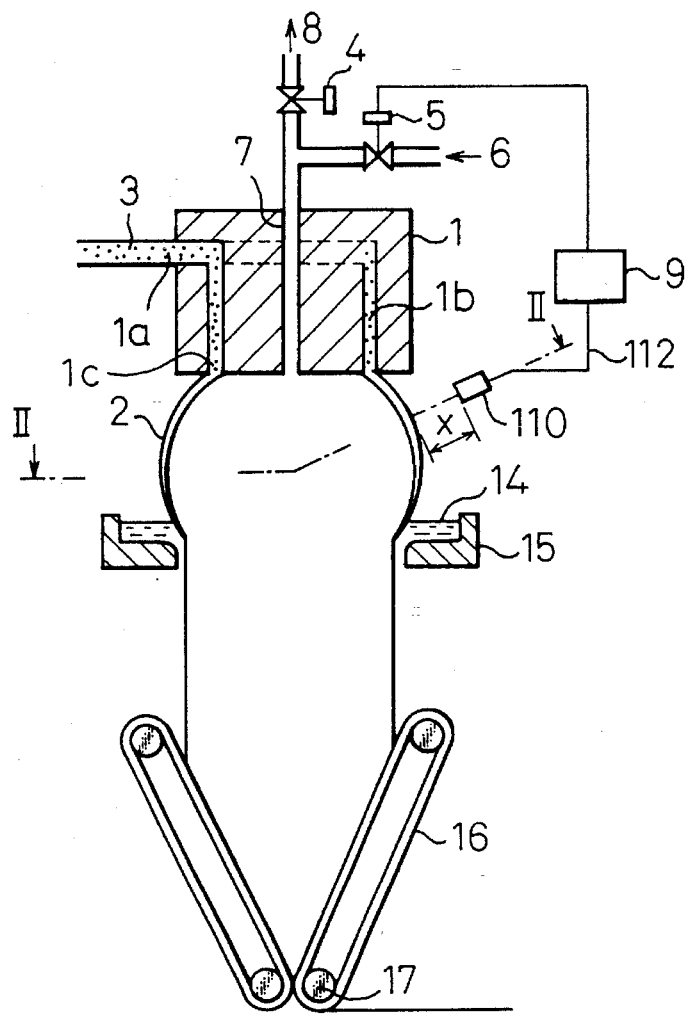
FIG. 1 is a diagrammatic view of a film manufacturing apparatus according to the first embodiment of the present invention.
Figure 2:
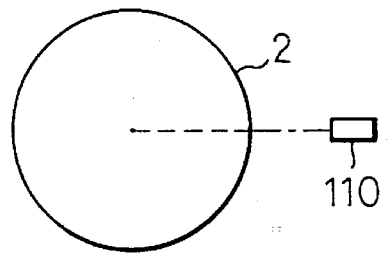
FIG. 2 is a cross-sectional view taken along the line II—II in FIG. 1.

FIGS. 1 and 2 show a film manufacturing apparatus according to the first embodiment of the present invention. The film manufacturing apparatus comprises a circular die 1 and a cooling ring 15. The circular die 1 has a vertical axis, an inlet 1a for a molten plastic 3, a cylindrical plastic passage 1b in communication with the inlet 1a, and a lip-shaped circular outlet 1c arranged at the bottom surface of the circular die 1 around the axis thereof in communication with the plastic passage 1b. The molten plastic 3 is supplied into the inlet 1a from an extruding machine (not shown), and extruded from the lip-shaped circular outlet 1c as an annular molten plastic, i.e., as a bubble 2 in this case.

The circular die 1 also has blowing means for blowing pressurized air into the annular molten plastic extruded from the lip-shaped outlet 1c. Sufficient air is supplied to form the bubble 2. The blowing means comprises an air passage 7 arranged in the circular die 1 such that the air passage 7 opens at the bottom surface of the circular die 1 inside the lip-shaped circular outlet 1c. The air passage 7 is connected to an air supply line 6 leading to a source of pressurized air (not shown), and to an air discharge line 8. An air supply regulating valve 5 is arranged in the air supply line 6, and a discharge regulating valve 4 is arranged in the air discharge line 8. In the embodiment, the discharge regulating valve 4 is normally opened a small amount, and the air supply regulating valve 5 is mainly controlled by a controller 9 to control the amount of air in the air passage 7 to thus control the size of the bubble 2.

The cooling ring 15 is arranged coaxially with the circular die 1 below the circular die 1, and the bubble 2 is formed between the circular die 1 and the cooling ring 15. The cooling ring 15 contains cooling water 14. The cooling water 14 is in direct contact with the bubble 2 and flows down between the cooling ring 15 and the bubble 2 to rapidly cool the bubble 2 to allow the bubble 2 to be solidified. The inner periphery of the cooling ring 15 substantially restrains and controls the size of the lower end of the bubble 2 and the latter becomes the tubular plastic film below the cooling ring 15. The tubular plastic film is then converted into two flat sheets by a pair of endless guide belts 16 having nip rollers 17, the plastic sheets being then conveyed to a winding machine (not shown).

An ultrasonic sensor 110 is arranged at such a position that the ultrasonic sensor 110 is outside the bubble 2 formed between the circular die 1 and the cooling ring 15. The ultrasonic sensor 110 is arranged so as to aim at a point on a line passing through the axis of the circular die 1 from the outside of the bubble 2. More particularly, the ultrasonic sensor 110 is arranged near the circular die 1 and extends substantially downwardly obliquely toward the center of the bubble 2. The ultrasonic sensor 110 is connected to the controller 9 via a line 112. The ultrasonic sensor 110 detects a distance between a surface of the bubble 2 and the ultrasonic sensor 110 by transmitting an ultrasonic wave toward the bubble 2 and receiving an ultrasonic wave reflected by the bubble 2.

Figure 5:
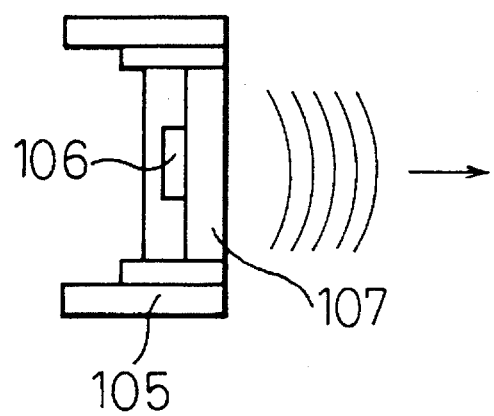
FIG. 5 is a diagrammatic view of the ultrasonic sensor.

FIG. 5 shows an example of the ultrasonic sensor 110 which comprises an outer case 105, a piezoelectric ceramic disk 106 supported by the outer case 105, and a vibration transferring membrane 107 contacting the disk 106 of piezoelectric ceramic material. The piezoelectric ceramic disk 106 has electrodes (not shown) on the opposite surfaces of the disk 106 and a power source is connected to the electrodes via conductor lines (not shown) to apply voltage to the piezoelectric ceramic disk 106. The piezoelectric ceramic disk 106 can also receive vibrations via the vibration transferring membrane 107 and a voltage appears on the piezoelectric ceramic disk 106. Therefore, the ultrasonic sensor 110 can transmit an ultrasonic wave and receive an ultrasonic wave.

Figure 6:
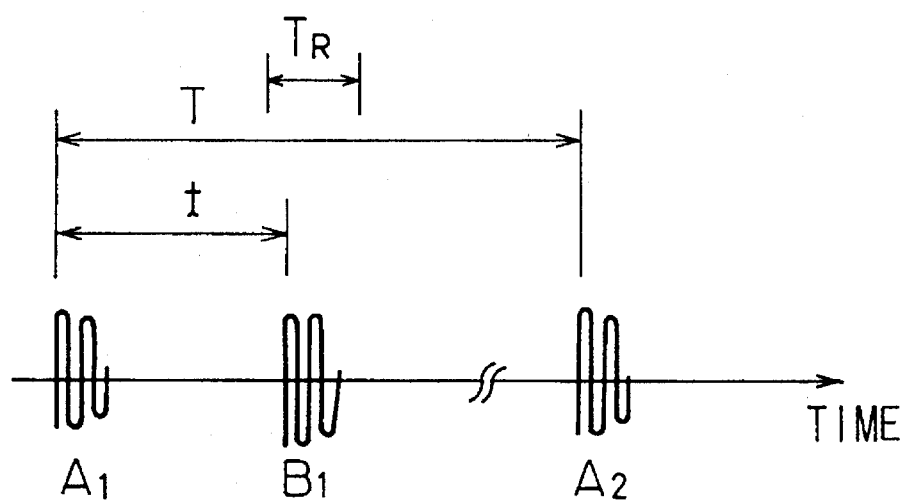
FIG. 6 is a view illustrating the transmitting and receiving timing of the ultrasonic sensor.

FIG. 6 shows the transmitting and receiving timing of the ultrasonic sensor 110. The ultrasonic sensor 110, for example, transmits an ultrasonic wave having a frequency of 200 KHz at a timing $A_1$, and after the time T (for example 25 ms) from the timing $A_1$, again transmits an ultrasonic wave having a frequency of 200 KHz at a timing $A_2$. That is, the ultrasonic sensor 110 cyclically transmits an ultrasonic wave at a time cycle T. The ultrasonic wave transmitted at the timing $A_1$ is reflected by the surface of the bubble 2, and received by the ultrasonic sensor 110 at a timing $B_1$. Accordingly, by measuring the time "t" between the timing $A_1$ and timing $B_1$, it is possible to detect a distance "X" between the surface of the bubble 2 and the ultrasonic sensor 110 from the relationship, $X=(½)\times t\times c$, where "c" is a sonic speed. The bubble 2 is always vibrating, and it will be preferable to obtain an average from several measured values.

The controller 9 controls the air supply regulating valve 5 in response to an output from the ultrasonic sensor 110 in the following manner. The air supply regulating valve 5 is closed when the distance between the bubble 2 and the ultrasonic sensor 110 is smaller than a first predetermined value (for example, 800 mm). Since the discharge regulating valve 4 is opened a small amount, the amount of air in the bubble 2 is reduced. Then, the air supply regulating valve 5 is opened when the distance between the bubble 2 and the ultrasonic sensor 110 is greater than a second predetermined value greater than the first predetermined value (for example, 805 mm), whereby the amount of air in the bubble 2 is increased. Note that the greater the diameter of the bubble 2, the smaller the distance between the bubble 2 and the ultrasonic sensor 110; and the smaller the diameter of the bubble 2, the greater the distance between the bubble 2 and the ultrasonic sensor 110. Accordingly, the size of the bubble 2 is controlled substantially uniformly in the small control range of 5 mm (805–800).

In this manner, according to the present invention, it is possible to control the size of the bubble 2 by the use of the single ultrasonic sensor 110. It has been found that a large proportion of the ultrasonic wave transmitted from the ultrasonic sensor 110 is reflected at the surface of the bubble 2 and a portion of the ultrasonic wave that passes through the surface of the bubble 2 is small. It is also found that the ultrasonic sensor 110 can transmit and receive the ultrasonic wave in a good condition within the angular range of appropriately 10 degrees, and so it is possible to reliably detect the distance between the bubble 2 and the ultrasonic sensor 110 without an accurate positioning of the ultrasonic sensor 110 after the ultrasonic sensor is once fixedly arranged, or even if the bubble 2 is vibrating. However, it is advantageous to mount the ultrasonic sensor 110 to a support member which is adjustable in height and angle. The single ultrasonic sensor 110 can be used for various kinds of films and various sizes of films.

Figure 3:
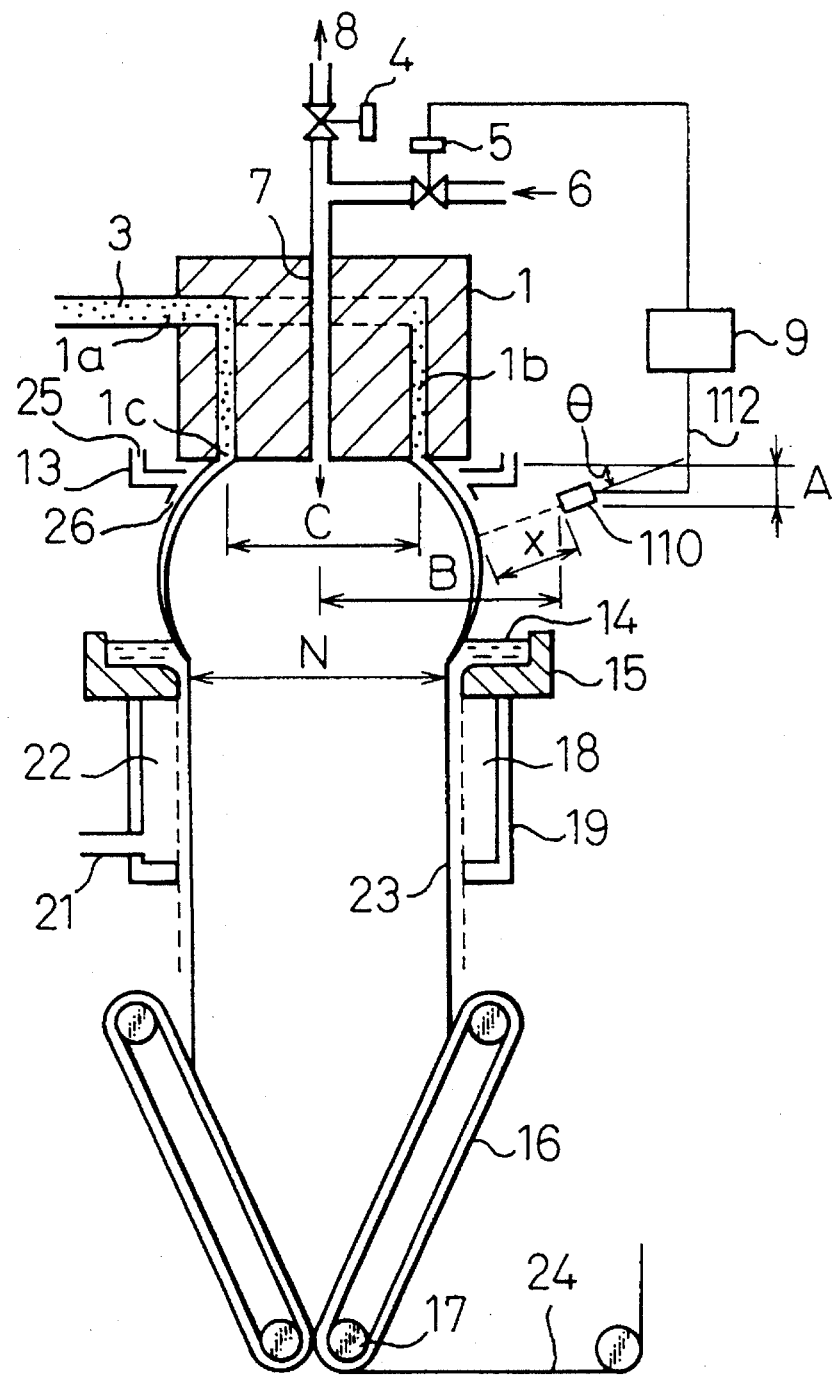
FIG. 3 is a diagrammatic view of a film manufacturing apparatus according to the second embodiment of the present invention.

FIG. 3 shows a film manufacturing apparatus according to the second embodiment of the present invention. This embodiment includes elements similar to those of the first embodiment. That is, this film manufacturing apparatus comprises a circular die 1 and a cooling ring 15. The circular die 1 has an inlet 1a for a molten plastic 3, a cylindrical plastic passage 1b in communication with the inlet 1a, a lip-shaped circular outlet 1c arranged at the bottom surface of the circular die 1 in communication with the plastic passage 1b, and an air passage 7 as blowing means. The amount of air in the air passage 7 is controlled by an air supply regulating valve 5 and a discharge regulating valve 4. The air supply regulating valve 5 is controlled by a controller 9.

The cooling ring 15 is arranged coaxially with the circular die 1 below the circular die 1, and the bubble 2 is formed between the circular die 1 and the cooling ring 15. In this embodiment, a preliminary air cooling ring 13 is arranged below the circular die 1 and adjacent to the circular die 1. The air cooling ring 13 has an inlet 25 for cooling air and nozzles 26 for blowing the cooling air.

The water cooling ring 15 has a cylindrical net 18 and a vacuum chamber 19. The cooling ring 15 contains cooling water 14 which is in direct contact with the bubble 2 and flows down between the cooling ring 15 and the bubble 2 to rapidly cool the bubble 2 and solidify the bubble 2. The cooling water 14 flows down along the expandable net 18 hanging down from the cooling ring 15 to cool the solidified tubular plastic film 23. The vacuum chamber 19 is arranged outside the net 18 and has a vacuum inlet 21 to introduce vacuum into the interior 22 of the vacuum chamber 19. The vacuum in the vacuum chamber 19 coacts with the amount of air in the bubble 2 so that the bubble 2 is forced into contact with the net 18 to stably hold the tubular plastic film 23. The inner periphery of the cooling ring 15 substantially restrains the lower end of the bubble 2 and the latter becomes the tubular plastic film 23 below the cooling ring 15. The tubular plastic film is then converted into two flat sheets by a pair of endless guide belts 16 having nip rollers 17, the plastic sheets 24 being then conveyed to a subsequent process (a winding machine or the like).

An ultrasonic sensor 110 is arranged at such a position that the ultrasonic sensor 110 is outside the bubble 2 so as to aim substantially at the center of the bubble 2. The ultrasonic sensor 110 is identical to one previously described with reference to FIGS. 5 and 6, and can transmit an ultrasonic wave toward the bubble 2 and receive an ultrasonic wave reflected at the bubble 2. It is possible to use an ultrasonic sensor distributed as UD-320 by Keyence Corporation as the ultrasonic sensor 110.

The ultrasonic sensor 110 is arranged so as to aim at a point on a line passing through the axis of the circular die 1 from the outside of the bubble 2 formed between the circular die 1 and the cooling ring 15. The ultrasonic sensor 110 is arranged near the circular die 1 and extends substantially downwardly and obliquely toward the center of the bubble 2. The ultrasonic sensor 110 is connected to the controller 9 via a line 112.

When the kind of the product changes, the diameter of the cooling ring 15 is sometimes changed correspondingly. Accordingly, a distance between the circular die 1 and the cooling ring 15 will change and the shape of the bubble 2 will change. The ultrasonic sensor 110 has an effective distance for detection. In these circumstances, it is advantageous to select a position of the ultrasonic sensor 110 so that the single, fixedly positioned ultrasonic sensor 110 can be used for various cooling rings 15 to be used.

In the embodiment, it is possible to repeatedly form a stable bubble under the following condition.
Thickness of film 130 μm (LDPE 15—HDPE 100—LDPE 15)
Diameter C of lip 600 mm
Distance A from bottom surface of die to sensor 160 mm
Distance B from axis of die to sensor 1410 mm
Angle θ of axis of sensor relative to horizontal 20°

Under these conditions, the relationship among the inner diameter N of the cooling ring 15, the distance X between the circular die 1 and the cooling ring 15, and the dead zone are as follows.

| N (mm) | X (mm) | Control Range (mm) |
| --- | --- | --- |
| 720 | 990 | X ± 5 |
| 950 | 895 | X ± 5 |
| 1080 | 850 | X ± 5 |

It is possible to manufacture any kind of plastic films which can be manufactured by an inflation (blowing) method. For example, HDPE, PP, LDPE, and LLDPE, a copolymer including these members, and a multilayer film including these members can be manufactured. The size of the bubble 2 can be controlled substantially uniformly in the small control range of X±5 mm. It is possible to change the control range to a smaller value, for example, X±0.5 mm.

Figure 4:
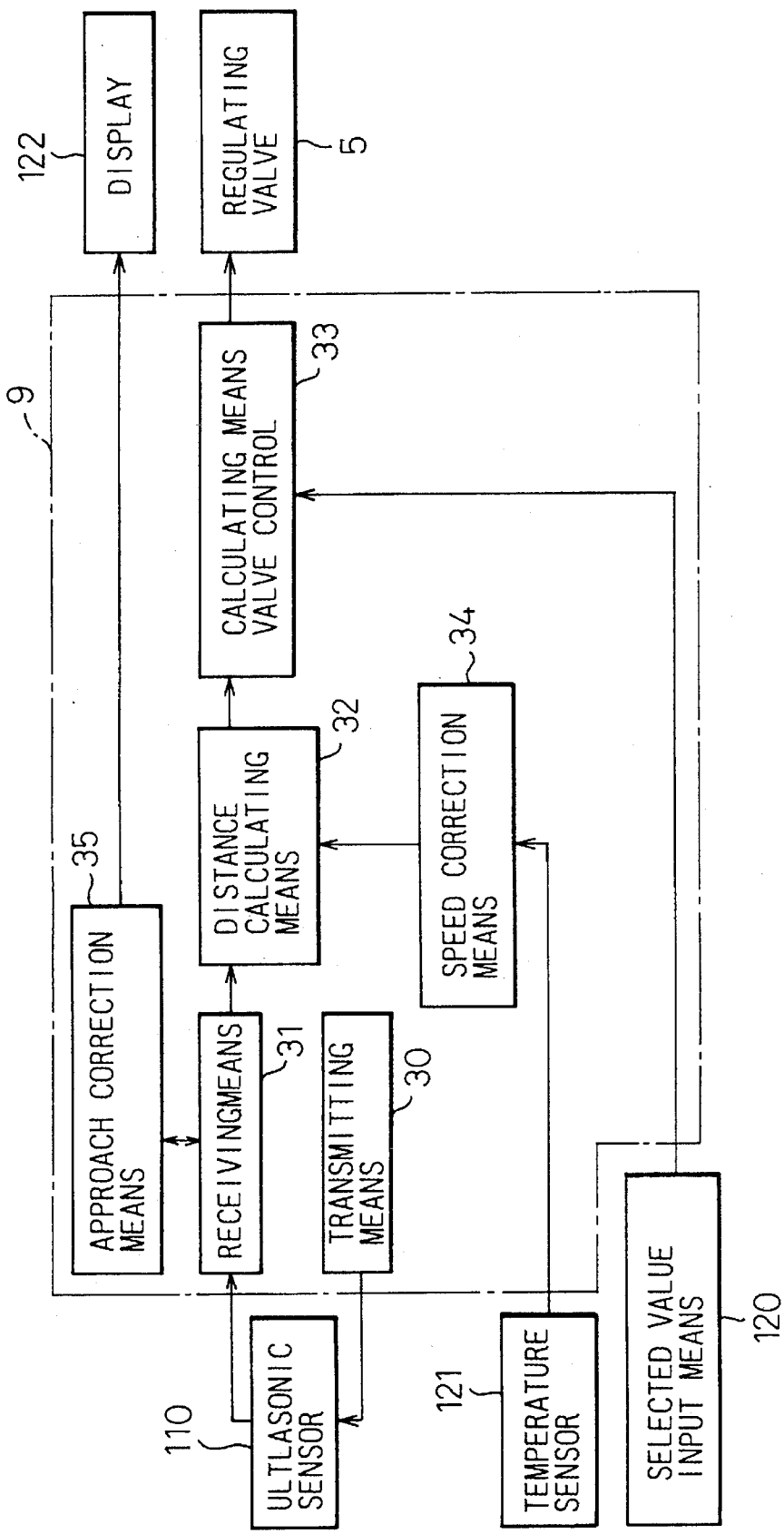
FIG. 4 is a block diagram illustrating the details of the controller.

FIG. 4 is a block diagram illustrating the arrangement and the functions of the controller 9. Interfaces and drive circuits are omitted in FIG. 4. The controller 9 includes a transmitting means 30 for causing the ultrasonic sensor 110 to transmit an ultrasonic signal having a predetermined frequency for a predetermined time period (FIG. 6) and a receiving means 31 for allowing the ultrasonic sensor 110 to receive the ultrasonic signal reflected from the bubble 2 and processing the received signal. The receiving means 31 includes amplifier means and detector means, and outputs a signal corresponding to the time "t" between the timings $A_1$ and $B_1$ of FIG. 6. Distance calculating means 32 calculates the distance "X" between the surface of the bubble 2 and the ultrasonic sensor 110 from the relationship, $X=(\frac{1}{2}) \times t \times c$. Valve control calculating means 33 compares the detected distance "X" with a selected value input from a selected value input means 120 and generates a signal to drive the air supply regulating valve 5.

Temperature sensor 121 is arranged for detecting an ambient temperature around the film manufacturing apparatus, and the controller 9 also comprises speed correction means 34 for correcting for the speed of an ultrasonic wave in response to an output from the temperature sensor 121. The temperature of the molten plastic at the lip-shaped circular outlet 1c in the film manufacturing apparatus is approximately 200° C., and accordingly, the ambient temperature around the film manufacturing apparatus rises to 45° C. in summer. The ambient temperature around the film manufacturing apparatus may be 15° C. in winter. The speed of the ultrasonic wave changes depending on the temperature. Therefore, it has been found that it is possible to more exactly detect the distance "X" between the surface of the bubble 2 and the ultrasonic sensor 110 in accordance with the instant temperature, by correcting for the sonic speed "c" used in the distance calculating means 32 in response to the detected ambient temperature around the film manufacturing apparatus. The correction can be carried out, using a known relationship between the temperature and the sonic speed.

The controller 9 also comprises approach correction means 35. The approach correction means 35 comprises speed detecting means for detecting a varying speed of a surface of the bubble 2 facing the ultrasonic sensor 110, and receiving time selecting means operative in response to an output from the speed detecting means for correcting a time period during which an ultrasonic wave reflected from the bubble 2 can be received.

The speed detecting means is constructed to receive the receiving means 31. Since the receiving means 31 outputs a signal corresponding to the time "t" between the timings $A_1$ and $B_1$ of FIG. 6, it is possible to calculate the varying speed of the surface of the bubble 2 facing to the ultrasonic sensor 110 by sampling a plurality of values of the time "t" during a certain time period. The thus detected varying speed of the surface of the bubble 2 is exhibited on a display 122. FIG. 9 shows a part of the display 122 which shows the varying speed of the surface of the bubble 2 (approach speed) is 1600 mm/s. In the embodiment, the varying speed of the surface of the bubble 2 is shown in units of 400 mm/s.

The transmitting means 30 transmits an ultrasonic wave at the timings $A_1$, $A_2$ and so on. The receiving means 31 receives the reflected ultrasonic wave at the timing $B_1$. Since the timing on which the reflected ultrasonic wave is received varies, the receiving of the reflected ultrasonic wave is allowed within a certain time period (for example, $T_R$ in FIG. 6). When the bubble 2 is inflating, shrinking, or vibrating, the arriving time of the ultrasonic wave reflected at the bubble 2 to the ultrasonic sensor 110 considerably varies. The smaller the time period during which an ultrasonic wave reflected at the bubble 2 can be received, the smaller a possibility of receiving noises. However, the smaller the time period during which an ultrasonic wave reflected from the bubble 2 can be received, the greater a possibility that the ultrasonic wave cannot be received within that time period. Therefore, according to the present invention, it is advantageous to change or correct the time period during which the ultrasonic wave reflected from the bubble 2 can be received, depending on the varying speed of the surface of the bubble 2. The receiving time selecting means functions to change or correct this time period.

FIGS. 7 and 8 show the period during which the ultrasonic wave can be received, which are predetermined by the receiving time selecting means. FIG. 7 shows the receivable time period $T_{R1}$ when the varying speed of the surface of the bubble 2 is relatively small. FIG. 8 shows the receivable time period $T_{R2}$ when the varying speed of the surface of the bubble 2 is relatively great.

Figure 10:
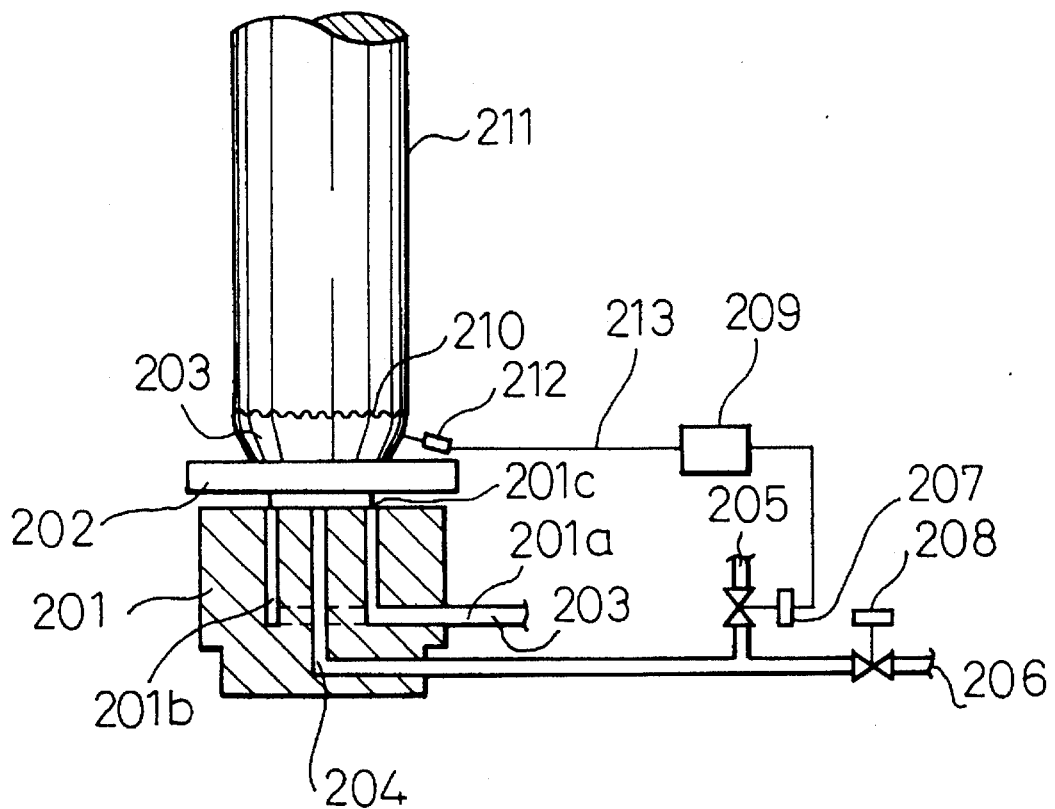
FIG. 10 is a diagrammatic view of a film manufacturing apparatus according to the third embodiment of the present invention.

FIG. 10 shows a film manufacturing apparatus according to the third embodiment of the present invention. In this embodiment, the film manufacturing apparatus comprises a circular die 201 and an air ring 202. The circular die 201 has a vertical axis, an inlet 201a for a molten plastic 203, a cylindrical plastic passage 201b in communication with the inlet 201a, and a lip-shaped circular outlet 201c arranged at the top surface of the circular die 201 about the axis thereof in communication with the plastic passage 201b. The molten plastic 203 is supplied into the inlet 201a from an extruding machine (not shown), and extruded from the lip-shaped circular outlet 201c as an annular molten plastic.

The circular die 201 also has blowing means for blowing air into the annular molten plastic extruded from the lip-shaped circular outlet 201c. The blowing means comprises an air passage 204 opening at the top surface of the circular die 201. The air passage 204 is connected to an air supply line 205 leading to a source of air (not shown), and to an air discharge line 206. An air supply regulating valve 207 is arranged in the air supply line 205, and a discharge regulating valve 208 is arranged in the air discharge line 206. The discharge regulating valve 208 is normally opened a small amount, and the air supply regulating valve 207 is mainly controlled by a controller 209 to control the amount of air in the air passage 204. The controller 209 is arranged similar to the controller 9 of the previous embodiments.

The air ring 202 is arranged coaxially with the circular die 201 above the circular die 201 to cool the bubble 2 to allow the bubble 2 to be solidified, and a frost line 210 appears beyond which the annular molten plastic becomes a tubular plastic film 211.

An ultrasonic sensor 212 is arranged near and above the circular die 201. The ultrasonic sensor 212 is arranged so as to aim at a point on a line passing through the axis of the circular die 201 between the circular die 201 and the frost line 210 so that a line passing through the ultrasonic sensor 212 is perpendicular to the surface of the annular molten plastic extruded from the lip-shaped circular outlet 201c. The ultrasonic sensor 212 is connected to the controller 209 via a line 213. The ultrasonic sensor 212 detects a distance between the surface of the annular molten plastic and the ultrasonic sensor 212 by transmitting an ultrasonic wave toward the annular molten plastic and receiving an ultrasonic wave reflected from the annular molten plastic. Accordingly, it is possible to control the size of the tubular plastic film 211 by controlling the air supply regulating valve 207 in response to the output from the ultrasonic sensor 212, in a manner similar to the previous embodiment. Since the position of the annular molten plastic is nearer to the circular die than the position of the tubular plastic film which is solidified, a variation in the size of the annular molten plastic is small. Accordingly, it is sufficient to arrange a single ultrasonic sensor and it is possible to easily and reliably detect the size of a annular molten plastic to control the size of the tubular plastic film.

As explained in detail, it is possible to easily and reliably detect the size of a bubble with the use of a single fixedly arranged ultrasonic sensor. It is not necessary to pay a great attention to the position of the ultrasonic sensor when the manufacturing condition changes, but it is possible to easily adjust the position of the ultrasonic sensor in accordance with experimentally obtained data.

What is claimed is:

1. A film manufacturing apparatus comprising:
    a circular die having an axis, an inlet for a molten plastic, a lip-shaped circular outlet around the axis for extruding a molten plastic in an annular molten plastic form, and blowing means for blowing air into the annular molten plastic extruded from the lip-shaped circular outlet;
    cooling means for cooling the annular molten plastic to form a tubular plastic film;
    an ultrasonic sensor for detecting a distance between the surface of the annular molten plastic and the ultrasonic sensor by transmitting an ultrasonic wave toward the annular molten plastic at a place located between the die and the cooling means and receiving an ultrasonic wave reflected from the annular molten plastic; and
    control means for controlling the blowing means in response to an output from the ultrasonic sensor.

2. A film manufacturing apparatus according to claim 1, wherein the cooling means comprises a cooling ring containing cooling water and arranged below the circular die to cool the molten plastic and to restrain a size of the molten plastic to form a bubble between the circular die and the cooling ring and to form the tubular plastic film below the cooling ring.

3. A film manufacturing apparatus according to claim 2, wherein the ultrasonic sensor is arranged so as to aim at a point on a line passing through the axis of the circular die from outside the bubble formed between the circular die and the cooling ring.

4. A film manufacturing apparatus according to claim 3, wherein the ultrasonic sensor is arranged near the circular die, said ultrasonic sensor substantially extending downwardly toward a center of the bubble and extending obliquely relative to a plane perpendicular to the axis of the die.

5. A film manufacturing apparatus according to claim 1, further comprising temperature detecting means for detecting an ambient temperature around said film manufacturing apparatus, and speed correction means for correcting a speed of the ultrasonic wave in response to an output from the temperature detecting means.

6. A film manufacturing apparatus according to claim 1, further comprising speed detecting means for detecting a varying speed of the surface of the bubble facing the ultrasonic sensor, and receiving time selecting means operative in response to an output from the speed detecting means for correcting a time period during which the ultrasonic wave reflected from the bubble can be received.

7. A film manufacturing apparatus according to claim 1, wherein the blowing means is constructed such that an amount of air in the bubble is reduced when the distance between the bubble and the ultrasonic sensor is smaller than a first predetermined value, and the amount of air in the bubble is increased when the distance between the bubble and the ultrasonic sensor is greater than a second predetermined value greater than the first predetermined value.

8. A film manufacturing apparatus according to claim 7, wherein the blowing means comprises an air passage arranged in the circular die, an air supply line in communication with the air passage, an air discharge line in communication with the air passage, an air supply regulating valve arranged in the air supply line, and a discharge regulating valve arranged in the air discharge line, the control means controlling at least one of the air supply regulating valve and the discharge regulating valve.

9. A film manufacturing apparatus according to claim 8, wherein the discharge regulating valve is normally open a small amount, and the control means controls the air supply regulating valve in response to an output from the ultrasonic sensor.

10. A film manufacturing apparatus according to claim 1, wherein the cooling means comprises an air cooling means for blowing cooling air to the annular molten plastic so that a frost line appears beyond which the annular molten plastic becomes a tubular plastic film.

11. A film manufacturing apparatus according to claim 10, wherein said ultrasonic sensor is arranged perpendicular to the surface of the annular molten plastic.

12. A film manufacturing apparatus according to claim 10, wherein said ultrasonic sensor is the only sensor which transmits an ultrasonic wave toward the annular molten plastic and receives an ultrasonic wave reflected from the annular molten plastic.

13. A film manufacturing apparatus according to claim 1, wherein said ultrasonic sensor is the only sensor which transmits an ultrasonic wave toward the annular molten plastic and receives an ultrasonic wave reflected from the annular molten plastic.

14. A film manufacturing apparatus comprising:

a circular die having an axis, an inlet for a molten plastic, a lip-shaped circular outlet around the axis for extruding a molten plastic in an annular molten plastic form, and blowing means for blowing pressurized air into the annular molten plastic extruded from the lip-shaped circular outlet to form a bubble of molten plastic;

a cooling ring containing cooling water and arranged below the circular die to cool the bubble of molten plastic and to restrain the bubble so as to form a tubular plastic film below the cooling ring;

an ultrasonic sensor arranged near the circular die and substantially extending downwardly obliquely toward a center of the bubble for detecting a distance between a surface of the bubble and the ultrasonic sensor by transmitting an ultrasonic wave toward the bubble at a place between the die and the cooling ring and receiving an ultrasonic wave reflected from the bubble; and control means for controlling the blowing means in response to an output from the ultrasonic sensor.

15. A film manufacturing apparatus comprising:

a circular die having an axis, an inlet for a molten plastic, a lip-shaped circular outlet around the axis for extruding a molten plastic in an annular molten plastic form, and blowing means for blowing air into the annular molten plastic extruded from the lip-shaped circular outlet;

cooling means for cooling the annular molten plastic to form a tubular plastic film, said cooling means including a cooling ring containing cooling water and arranged below the circular die to cool the molten plastic and restrain a size of the molten plastic to form a bubble between the circular die and the cooling ring and to form the tubular plastic film below the cooling ring;

an ultrasonic sensor for detecting a distance between the surface of the annular molten plastic and the ultrasonic sensor by transmitting an ultrasonic wave toward the annular molten plastic at a place located between the die and the cooling means and receiving an ultrasonic wave reflected from the annular molten plastic, said ultrasonic sensor being arranged near the circular die, said ultrasonic sensor substantially extending downwardly toward a center of the bubble and extending obliquely relative to a plane perpendicular to the axis of the die; and control means for controlling the blowing means in response to an output from the ultrasonic sensor.

16. A film manufacturing apparatus comprising:

a circular die having an axis, an inlet for a molten plastic, a lip-shaped circular outlet around the axis for extruding a molten plastic in an annular molten plastic form, and blowing means for blowing air into the annular molten plastic extruded from the lip-shaped circular outlet;

cooling means for cooling the annular molten plastic to form a tubular plastic film, said cooling means including an air cooling means for blowing cooling air to the annular molten plastic so that a frost line appears between the annular molten plastic and the tubular plastic film;

an ultrasonic sensor for detecting a distance between the surface of the annular molten plastic and the ultrasonic sensor by transmitting an ultrasonic wave toward the annular molten plastic at a place located between the die and the cooling means and receiving an ultrasonic wave reflected from the annular molten plastic, said ultrasonic sensor being arranged obliquely relative to a plane perpendicular to the axis of the die and being aimed at the annular molten plastic between the circular die and the frost line; and control means for controlling the blowing means in response to an output from the ultrasonic sensor.

17. A film manufacturing apparatus according to claim 16, wherein said ultrasonic sensor is arranged perpendicular to the surface of the annular molten plastic.

* * * * *

UNITED STATES PATENT AND TRADEMARK OFFICE
CERTIFICATE OF CORRECTION

PATENT NO. : 5,470,216
DATED : November 28, 1995
INVENTOR(S) : Saito et al.

It is certified that error appears in the above-indentified patent and that said Letters Patent is hereby corrected as shown below:  On the title page:

Section [73] Assignee:  change "Petrochmicals" to --Petrochemicals--.

Signed and Sealed this

Third Day of February, 1998

BRUCE LEHMAN

Attest:

*Attesting Officer*            *Commissioner of Patents and Trademarks*